United States Patent
Jo et al.

(10) Patent No.: US 9,319,886 B2
(45) Date of Patent: Apr. 19, 2016

(54) METHOD FOR EFFICIENT CHANNEL USE

(75) Inventors: Junho Jo, Anyang-si (KR); Jihyun Lee, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 143 days.

(21) Appl. No.: 13/638,904

(22) PCT Filed: Mar. 31, 2011

(86) PCT No.: PCT/KR2011/002202
§ 371 (c)(1),
(2), (4) Date: Oct. 1, 2012

(87) PCT Pub. No.: WO2011/122860
PCT Pub. Date: Oct. 6, 2011

(65) Prior Publication Data
US 2013/0039315 A1    Feb. 14, 2013

Related U.S. Application Data

(60) Provisional application No. 61/319,882, filed on Apr. 1, 2010, provisional application No. 61/359,361, filed on Jun. 29, 2010, provisional application No. 61/380,196, filed on Sep. 3, 2010, provisional application No. 61/408,640, filed on Oct. 31, 2010.

(51) Int. Cl.
*H04W 36/00* (2009.01)
*H04W 16/14* (2009.01)
(Continued)

(52) U.S. Cl.
CPC .............. *H04W 16/14* (2013.01); *H04B 15/00* (2013.01); *H04W 28/04* (2013.01); *H04W 72/02* (2013.01)

(58) Field of Classification Search
None
See application file for complete search history.

(56) References Cited

U.S. PATENT DOCUMENTS

| 2003/0142645 A1 | 7/2003 | Belcea |
| 2005/0185629 A1 | 8/2005 | Kuroda et al. |

(Continued)

FOREIGN PATENT DOCUMENTS

| CN | 1701533 | 11/2005 |
| JP | 2012-529780 | 11/2012 |

(Continued)

OTHER PUBLICATIONS

IEEE Computer Society and the IEEE Microwave Theory and Techniques Society, "Part 16: Air Interface for Broadband Wireless Access Systems," IEEE Standard for Local and metropolitan area networks, IEEE Std 802.16, May 2009, 2082 pages.

(Continued)

*Primary Examiner* — Ayaz Sheikh
*Assistant Examiner* — Sori Aga
(74) *Attorney, Agent, or Firm* — Lee, Hong, Degerman, Kang & Walmey; Jonathan Kang; Michael Monaco

(57) ABSTRACT

According to one embodiment of the present invention, a method for efficient channel use is disclosed. The channel use method may comprise the steps of: selecting a specific channel from channels configured to be shared along with a homogeneous or heterogeneous communication scheme; and performing an interference avoidance procedure if the selected channel interferes with a neighboring access point. The avoidance procedure may comprise one or more of a process of making a request to switch a channel of the neighboring access point, a process of notifying to the neighboring access point, and a process of changing the selected channel into another channel.

2 Claims, 9 Drawing Sheets

(51) Int. Cl.
*H04B 15/00* (2006.01)
*H04W 28/04* (2009.01)
*H04W 72/00* (2009.01)
*H04W 72/02* (2009.01)

(56) References Cited

U.S. PATENT DOCUMENTS

| | | |
|---|---|---|
| 2006/0013136 A1 | 1/2006 | Goldschmidt et al. |
| 2006/0195873 A1 | 8/2006 | Gopalan et al. |
| 2008/0089306 A1 | 4/2008 | Hu |
| 2008/0089389 A1* | 4/2008 | Hu ............................... 375/132 |
| 2008/0205365 A1 | 8/2008 | Russell et al. |
| 2008/0253341 A1 | 10/2008 | Cordeiro et al. |
| 2008/0268832 A1 | 10/2008 | Peng |
| 2010/0056136 A1 | 3/2010 | Zhu |
| 2010/0135256 A1 | 6/2010 | Lee et al. |
| 2010/0136974 A1* | 6/2010 | Kim et al. ..................... 455/436 |
| 2010/0142559 A1 | 6/2010 | Hu |
| 2011/0019104 A1* | 1/2011 | Kwak et al. ................... 348/731 |
| 2011/0268024 A1 | 11/2011 | Jamp et al. |
| 2011/0286401 A1 | 11/2011 | Wijting et al. |
| 2011/0287802 A1 | 11/2011 | Ma et al. |
| 2011/0305206 A1 | 12/2011 | Junell et al. |
| 2012/0026883 A1 | 2/2012 | Chu et al. |
| 2012/0063383 A1* | 3/2012 | Barbieri et al. ............... 370/315 |
| 2012/0079559 A1 | 3/2012 | Reznik et al. |
| 2012/0120892 A1 | 5/2012 | Freda et al. |
| 2012/0134328 A1 | 5/2012 | Gauvreau et al. |

FOREIGN PATENT DOCUMENTS

| | | |
|---|---|---|
| KR | 10-2004-0028294 | 4/2004 |
| KR | 10-2007-0059924 | 6/2007 |
| KR | 10-2009-0031445 | 3/2009 |
| KR | 10-2009-0087178 | 8/2009 |
| KR | 10-2009-0091798 | 8/2009 |
| KR | 10-2009-0105304 | 10/2009 |
| KR | 10-2010-0026913 | 3/2010 |
| KR | 10-2010-0030171 | 3/2010 |
| WO | 2005/056251 | 6/2005 |

OTHER PUBLICATIONS

Korean Intellectual Property Office Application Serial No. 10-2013-7008601, Office Action dated Mar. 10, 2014, 4 pages.
Paivi Ruuska, et al., "P802.19.1 System Architecture," IEEE 802.19-10/46r3, Mar. 17, 2010.
Mika Kasslin, et al., "High level architecture view," IEEE 802.19-10/0019r0, Feb. 4, 2010.
Jianfeng Wang, et al., "First cognitive radio networking standard for personal/portable devices in tv white spaces," New Frontiers in Dynamic Spectrum, 2010 IEEE Symposium on Apr. 6-9, 2010, pp. 1-12.
A. Delphinanto, et al., "Improving quality of experience by adding device resource reservation to service discovery protocols," Communications, 2008, ICC '08, IEEE International Conference on May 19-23, 2008, pp. 1813-1818.
Shao-Yi Hung, "An opportunistic cognitive MAC protocol for coexistence with WLAN," Communications, 2008, ICC '08, IEEE International Conference on May 19-23, 2008, pp. 4059-4063.
"Draft standard for local and metropolitan area networks, Part 16: Air interface for fixed broadband wireless access systems," IEEE P802.16, IEEE, Mar. 2007.
A. Reznik, et al., "Channel selection support in TVWS," IEEE 802.19-10/0104r0, IEEE, Jul. 2010.
United States Patent and Trademark Office U.S. Appl. No. 13/819,503, Office Action dated Jan. 22, 2015, 15 pages.
United States Patent and Trademark Office U.S. Appl. No. 13/819,674, Office Action dated Nov. 17, 2014, 14 pages.
United States Patent and Trademark Office U.S. Appl. No. 13/820,076, Office Action dated Sep. 8, 2014, 6 pages.
Ruuska, et al., "P802.19.1 System Architecture," doc.: IEEE 802.19-10/46r3, Mar. 2010, 23 pages.
United States Patent and Trademark Office U.S. Appl. No. 13/638,887, Office Action dated Nov. 29, 2012, 9 pages.
Reznik, et al., "Channel Selection Support in TVWS," doc: IEEE 802.19-10/0104r0, Jul. 2010, 12 pages.
Eklund, et al., "IEEE Standard 802.16: A Technical Overview of the WirelessMAN™ Air Interface for Broadband Wireless Access," IEEE Communications Magazine, Jun. 2002, pp. 98-107.
The State Intellectual Property Office of the People's Republic of China Application Serial No. 201180042580.5, Office Action dated Oct. 28, 2014, 6 pages.
Sun, et al., "Coexistence Manager of Heterogeneous TVWS Networks," The Institute of Electronics, Information and Communication Engineers, IEICE Technical Report SR2009-100, Mar. 2010, 7 pages.
Baykas, et al., "System Design Document," IEEE P802.19 Wireless Coexistence, doc.: IEEE 802.19-10/0055r3, Mar. 2010, 15 pages.
Japan Patent Office Application Serial No. 2013-502478 Office Action dated Dec. 2, 2014, 3 pages.
The State Intellectual Property Office of the People's Republic of China Application Serial No. 201180021985.0, Office Action dated Dec. 31, 2014, 6 pages.
United States Patent and Trademark Office U.S. Appl. No. 13/820,054 Office Action dated Mar. 3, 2015, 15 pages.
United States Patent and Trademark Office U.S. Appl. No. 13/638,887 Final Office Action dated Mar. 26, 2015, 12 pages.
The State Intellectual Property Office of the People's Republic of China Application Serial No. 201180042580.5, Office Action dated Mar. 3, 2015, 8 pages.
Reznik, et al., "Channel Selection Support in TVWS," doc.: IEEE 802.19-10/0104r0, Jul. 2010, 12 pages.
Eklund, et al, "IEEE Standard 802.16: A Technical Overview of the WirelessMAN Air Interface for Broadband Wireless Access," IEEE Communications Magazine, Jun. 2002, pp. 98-107.

* cited by examiner

FIG.2
(A)
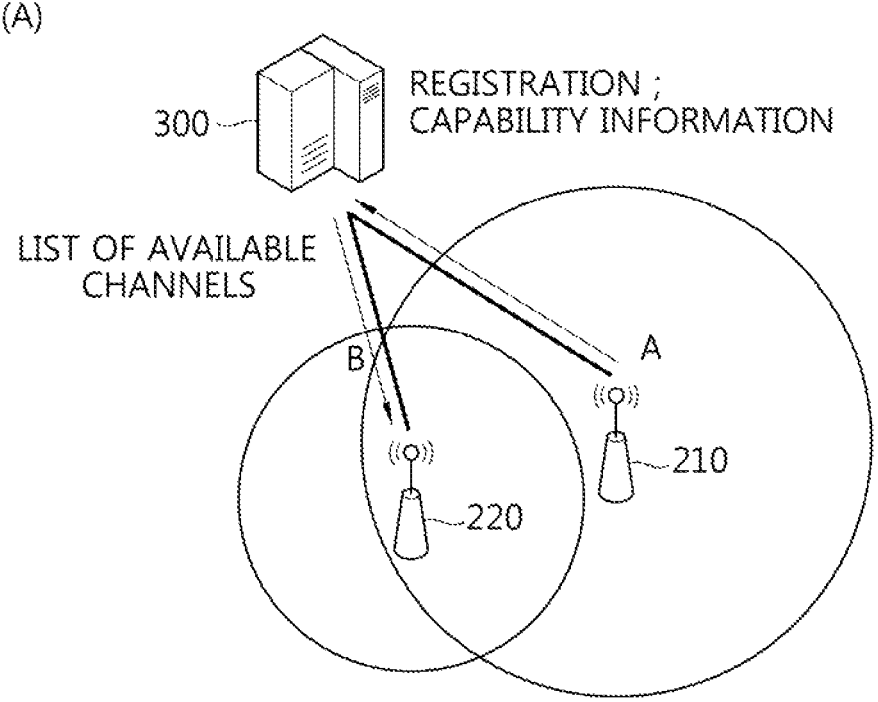
(B)
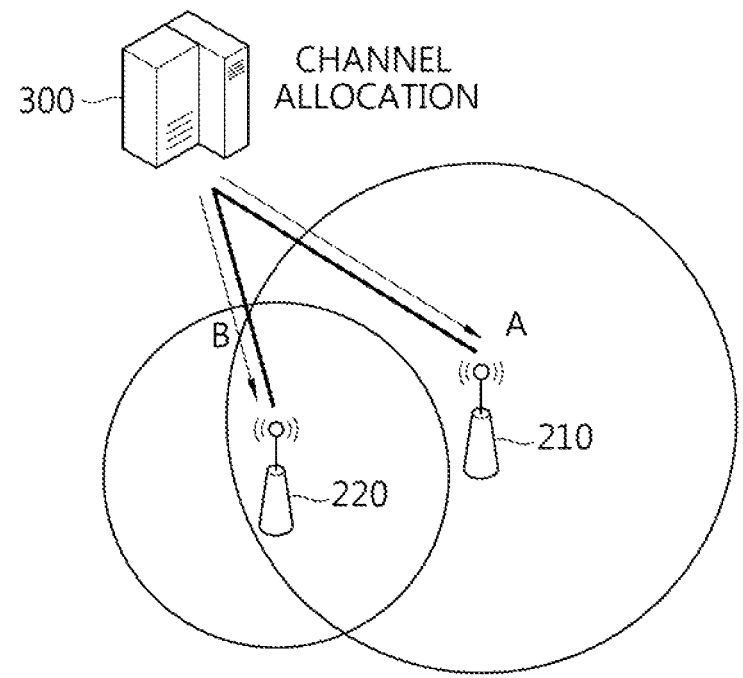

FIG.6
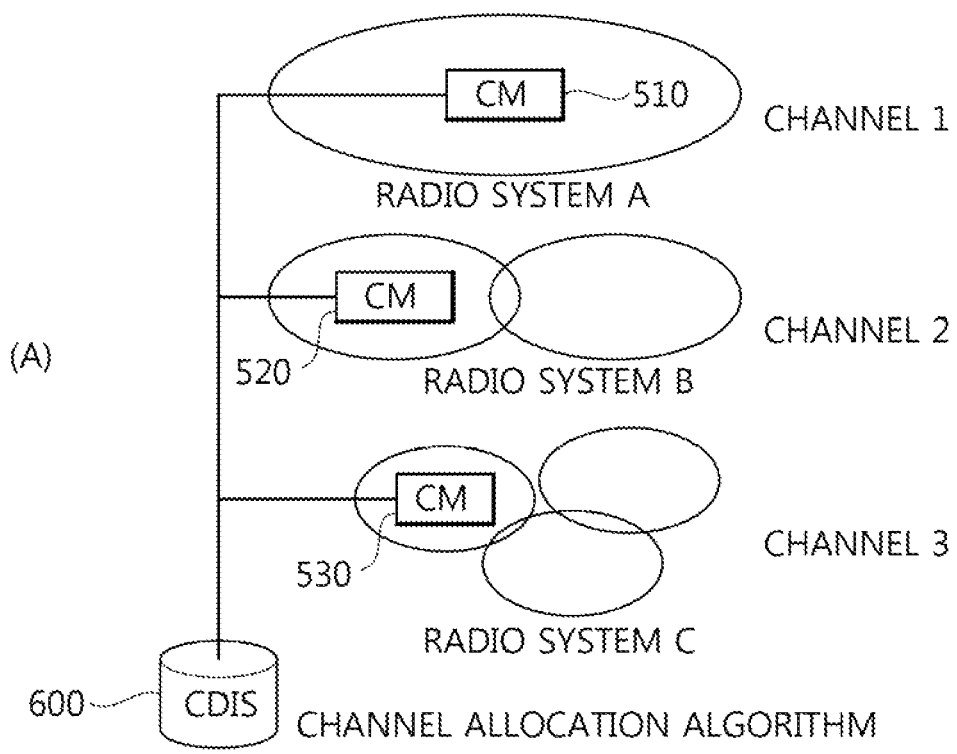
(A)
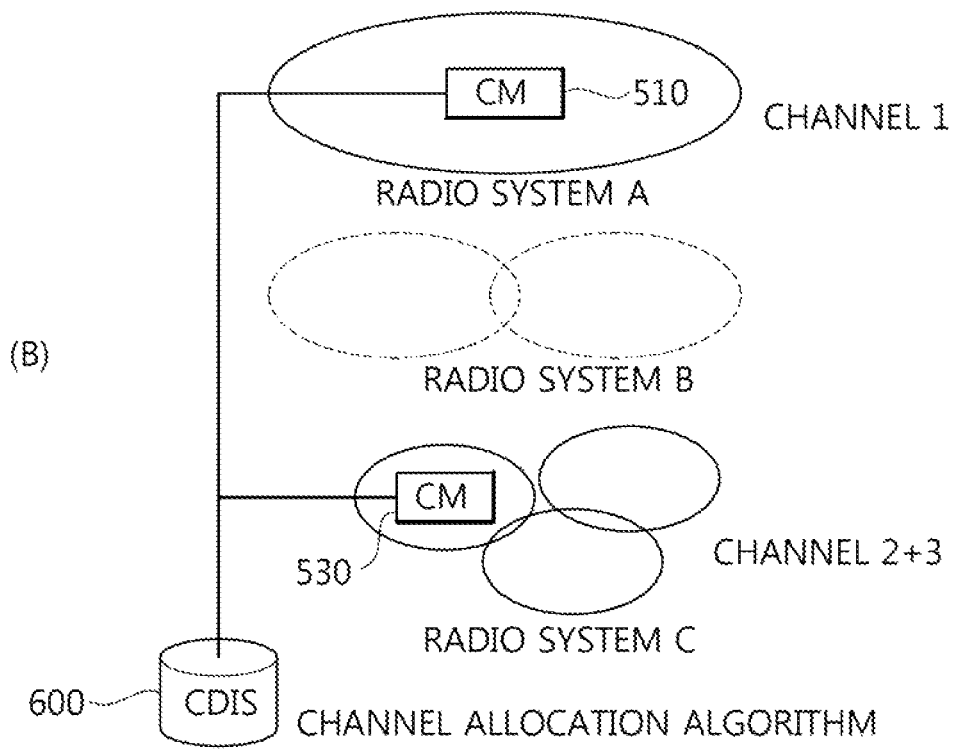
(B)

FIG.8
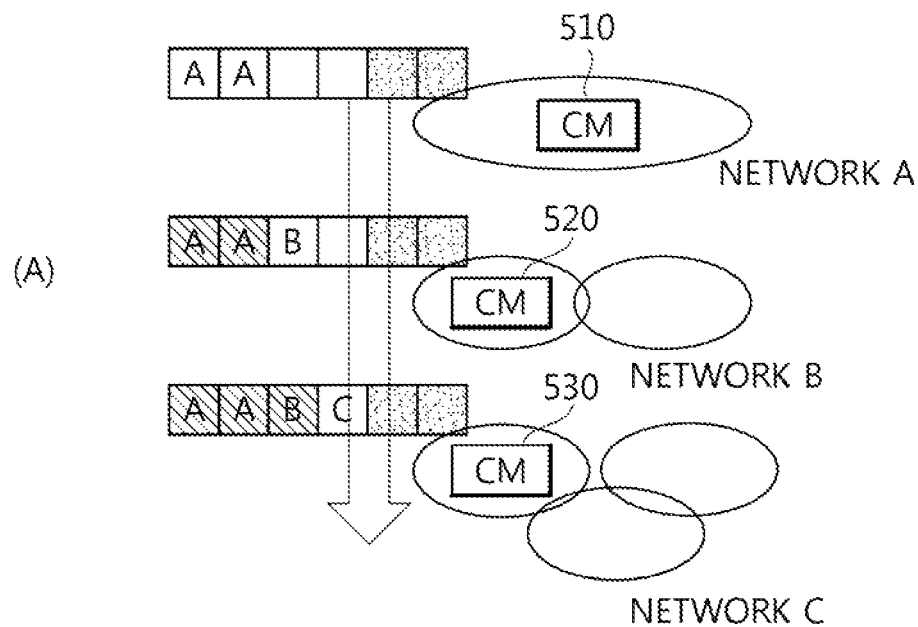
(A)
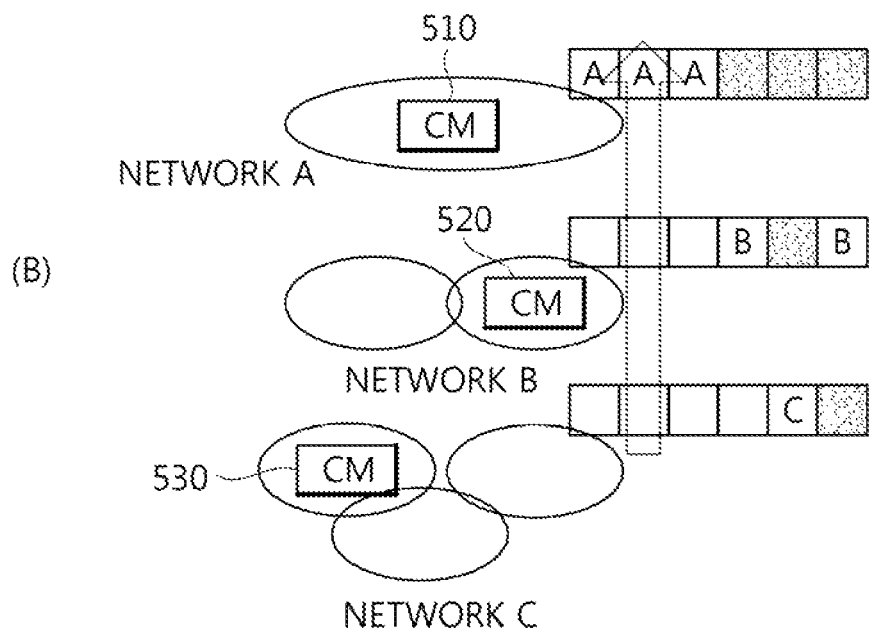
(B)

METHOD FOR EFFICIENT CHANNEL USE

CROSS-REFERENCE TO RELATED APPLICATIONS

This application is the National Stage filing under 35 U.S.C. 371 of International Application No. PCT/KR2011/002202, filed on Mar. 31, 2011, which claims the benefit of U.S. Provisional Application Ser. No. 61/319,882, filed on Apr. 1, 2010, U.S. Provisional Application Ser. No. 61/359,361, filed on Jun. 29, 2010, U.S. Provisional Application Ser. No. 61/380,196, filed on Sep. 3, 2010, and U.S. Provisional Application Ser. No. 61/408,640, filed on Oct. 31, 2010, the contents of which are all hereby incorporated by reference herein in their entirety.

TECHNICAL FIELD

The present invention relates to a method of efficiently using channels.

BACKGROUND ART

To assign a frequency for new service or to assign a frequency to a new service provider was conventionally performed at the instigation of a government.

In particular, if there are new broadcasters, frequencies, that is, limited resources, were distributed by allocating a new frequency through auction, etc. or by recovering the existing frequency from the existing broadcaster and deploying the recovered frequency to another broadcaster.

With the recent spread of a variety of wireless Internet-based applications, such as open type terminal platforms, App stores, and mobile VoIPs, however, there is an explosive increase of the demands for radio data traffic. Accordingly, the distribution of frequencies that is led by a government as described above is very inefficient, and to secure a new frequency on the frequency distribution table basically became to gradually difficult.

In particular, with the rapid growth of broadcasting and communication systems, the next-generation communication system is designed in the convergence form of several networks, the system gradually becomes complicated, and a need for interoperability between systems is gradually expanded. Furthermore, as communication technology and service are developed, frequency of use for frequency resources is increased the shortage problem of a frequency has reached a critical situation because a specific frequency band is fixed occupied in order to provide excellent communication technology and service.

A frequency sharing method has been in the spotlight as a scheme capable of solving the problems. The frequency sharing method starts from a viewpoint that a current frequency shortage phenomenon results from the existing partition type frequency management method and a frequency seems to be short on the frequency distribution table, but the frequency shortage problem can be solved through a sharing method.

As the shortage problem of frequency resources is recognized as being important worldwide, the Federal Communications Commission (FCC) of U.S. has decided to apply cognitive radio technology, that is, frequency sharing technology, for TV idle frequencies (white space) and has amended related rules in order to increase spectrum usage efficiency and facilitate the introduction of new service on November, 2008.

This movement is gradually expanded. In 2009, England has permitted the use of frequency sharing technology based on Cognitive Radio (CR) in bands that are not spatially used in TV broadcasting bands, that is, the white space band. EU is now reviewing an introduction method. In Korea, a frequency sharing policy using the white space band is being prepared.

Cognitive radio technology refers to a system in which a communication apparatus by itself monitors a communication environment, determines and selects an operating method for optimal communication, and plans a future determination process from previous communication experiences. That is, the cognitive radio technology is technology for searching for idle resources (spectrum hole, white space) that are rarely utilized or not temporally/spatially used, from among frequency bands allocated to unlicensed bands, and use the retrieved idle resources adaptively and opportunistically. Here, when a primary user having a license to a corresponding band is detected, the use of the corresponding band is stopped or transmission power is controlled so that the primary user does not suffer from damage.

Meanwhile, to search for an idle frequency band as described above can be embodied more conveniently in homogeneous communication systems. It is however very difficult to search for an idle frequency band among heterogeneous communication systems, for example, heterogeneous communication systems, such as IEEE 802.16, WCDMA, or LTE, because the communication systems use different frequency bands. This is described with reference to FIG. 1.

FIG. 1 shows a difference between the frequency bands of radio systems.

As can be seen with reference to FIG. 1(a), a radio system A uses a wide frequency band and great power, whereas a radio system B uses a narrow frequency band and small power.

If the system B that operates in the illustrated narrow band uses f2, f5, and f8, there is a problem in that a frequency is not efficiently used because the system A that has to use a wider band cannot use any one of the bands f1 to f9.

Furthermore, as can be seen with reference to FIG. 1(b), a radio system C uses a very wide bandwidth and low power.

Accordingly, if the above-described radio systems A, B, and C are placed in the same area, the radio systems A, B, and C may interference with one another. Furthermore, assuming that the radio system B tries to use the frequencies f2, f5, and f8 as operating frequencies, the radio systems A and B interference with each other because the radio system A uses the frequencies f2, f5, and f8 as operating frequencies.

Furthermore, if the system C that operates in a wide bandwidth uses the band f5, the system B does not have an available band, resulting in deteriorated system efficiency.

As described above, it is very difficult for a specific system to search for a frequency band not used by another system because heterogeneous systems use different frequency bands. That is, there is a disadvantage in that it is difficult to efficiently distribute frequency resources if several systems having different bandwidths coexist.

DISCLOSURE

Technical Problem

Accordingly, an object of embodiments proposed in this specification is to solve the above-described problems. In other words, the embodiments proposed in this specification are directed to enabling heterogeneous systems to utilize resources more efficiently.

Technical Solution

In order to achieve the object, in accordance with an embodiment of the present invention, there is proposed a scheme in which a radio system having a greater bandwidth preoccupies and uses a center frequency to be used. Furthermore, in accordance with an embodiment of the present invention, there is proposed a scheme in which a radio system having a smaller bandwidth determines a center frequency on the remaining frequencies.

In order to achieve the object, in accordance with an embodiment of the present invention, there is proposed a method of efficiently using channels. The channel use method may comprise the steps of: selecting a specific channel from channels configured to be shared along with a homogeneous or heterogeneous communication scheme; and performing an interference avoidance procedure if the selected channel interferes with a neighboring access point. The avoidance procedure may comprise one or more of a process of making a request to switch a channel of the neighboring access point, a process of notifying to the neighboring access point, and a process of changing the selected channel into another channel.

The neighboring access point may use a homogeneous or heterogeneous communication scheme.

The process of making the request to switch the channel may comprise requesting an entity that is responsible for a control function to switch a channel of the access point. The process of making the request to switch the channel may comprise requesting the access point to switch a channel.

The notification process may comprise transmitting a signal for informing interference.

The signal may be transmitted through a dedicated control channel for the neighboring access point.

Meanwhile, in accordance with another embodiment of the present invention, there is also proposed a method of efficiently using channels. The channel use method may comprise the steps of: generating information about idle channels from among channels configured to be shared along with a homogeneous or heterogeneous communication scheme; allocating one or more channels to each of a plurality of heterogeneous communication network entities using the generated information; receiving a channel switch request from any one of the plurality of heterogeneous communication network entities; and reallocating the allocated channels in response to the channel switch request.

In the step of allocating one or more channels, information about geographical locations of the plurality of heterogeneous communication network entities may be taken into account.

Advantageous Effects

Accordingly, in accordance with an embodiment proposed in this specification, the present invention enables resources to be more efficiently utilized between heterogeneous systems.

BRIEF DESCRIPTION OF THE DRAWINGS

FIG. 2 is an exemplary diagram showing that a frequency is efficiently used between heterogeneous systems in an unlicensed frequency band in accordance with an embodiment of the present invention.

FIG. 6 is an exemplary diagram according to the architecture of an IEEE 802.19 standard in accordance with yet another embodiment of the present invention.

FIG. 8 is another exemplary diagram according to the architecture of an IEEE 802.19 standard in accordance with yet another embodiment of the present invention.

MODE FOR INVENTION

Figure 1:
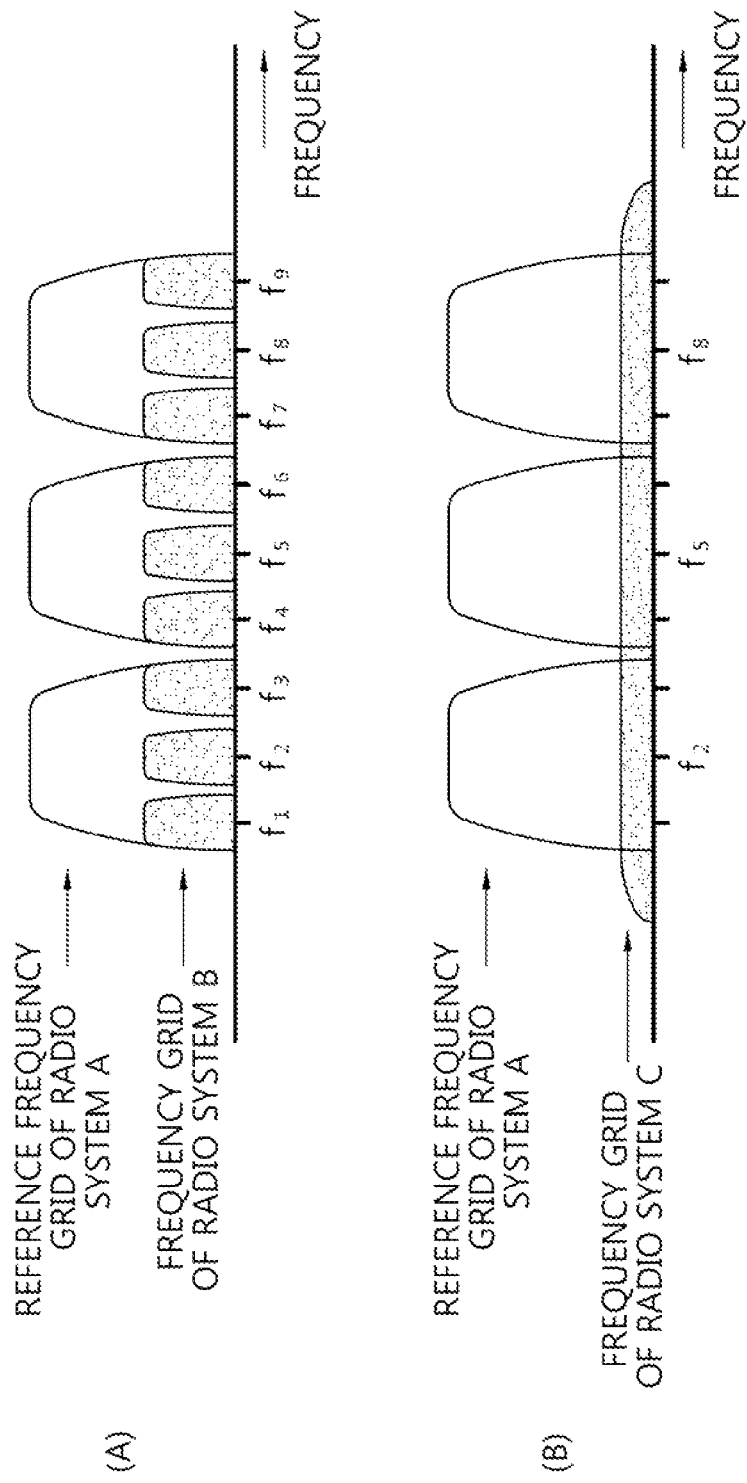
FIG. 1 shows a difference between the frequency bands of radio systems.

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention belongs, unless specifically defined in this specification, and should not be interpreted as having excessively comprehensive meanings or excessively reduced meanings. Furthermore, if the technical terms used in this specification are erroneous technical terms that do not precisely represent the spirit of the present invention, they should be replaced with technical terms that may be correctly understood by a person having ordinary skill in the art and understood. Furthermore, common terms used in the present invention should be interpreted according to the definitions of dictionaries or according to the context and should not be interpreted as having excessively reduced meanings.

Furthermore, an expression of the singular number used in this specification includes an expression of the plural number unless clearly defined otherwise in the context. In this application, terms, such as "comprise" and "include", should not be interpreted as essentially including all several elements or several steps described in the specification and should be interpreted as not including some of the elements or steps or as including additional element or steps.

Furthermore, terms including ordinal numbers, such as the first and the second which are used in this specification, may be used to describe a variety of elements, but the elements should not be limited to the terms. The terms are used to only distinguish one element from the other element. For example, a first element may be named a second element and likewise a second element may be named a first element without departing the scope of the present invention.

When it is said that one element is described as being "connected" or "coupled" to the other element, it should be understood that one element may be directly connected or coupled to the other element, but a third element may be interposed between the two elements. In contrast, when it is said that one element is described as being "directly connected" or "directly coupled" to the other element, it should be understood that a third element is not interposed between the two elements.

Hereinafter, preferred embodiments according to the present invention are described in detail with reference to the accompanying drawings. The same or similar elements are assigned the same reference numerals irrespective of reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

A term called a terminal is hereinafter used. The terminal may be called User Equipment (UE), Mobile Equipment (ME), a Mobile Station (MS), a User Terminal (UT), a Subscriber Station (SS), a Mobile Subscriber Station (MSS), a wireless device, a handheld device, or an Access Terminal (AT).

FIG. 2 is an exemplary diagram showing that a frequency is efficiently used between heterogeneous systems in an unlicensed frequency band in accordance with an embodiment of the present invention.

The unlicensed frequency band refers to a band that can be freely used without a license by a government or a specific organization. An empty frequency band not used by radio and television broadcasters, from VHF and UHF frequency bands distributed for TV broadcasting, has recently been designated as an unlicensed frequency band. Accordingly, anyone can use the empty frequency band if he or she satisfies conditions for a government's electric wave regulations. This frequency band is called TV white space. More particularly, in terms of space, this frequency band means a band that is made empty with consideration taken of frequency interference between radio and television broadcasters and a frequency band that is not used in each area or an area to which an electric wave for broadcasting does not reach. In terms of the time, the frequency band refers to a broadcasting frequency that is empty in a time zone where radio and television broadcasters do not transmit broadcasting early in the morning.

FIG. 2 shows that a central resource manager, for example, a control center performs management so that a frequency can be efficiently used between heterogeneous systems in an unlicensed frequency band.

Referring to FIG. 2(a), there are shown the access point 210 of a radio system A, the access point 220 of a radio system B, and a control center 300 for controlling the radio systems A and B. The access point may be based on IEEE 802.11 or may be based on IEEE 802.16. Alternatively, the access point may be a base station based on GSM, CDMA, WCDMA, LTE, or LTE-A.

The control center 300 is also called a Coexistence Database (or abbreviated to CDB) or also called a Coexistence Discovery and Information Server (CDIS) in IEEE 802.19.1.

The access point 210 of the radio system A can select a specific frequency band (or channel) from idle frequency bands (or idle channels). Likewise, the access point 210 of the radio system A can select a specific frequency band (or channel) from idle frequency bands (or idle channels).

The access point 210 of the radio system A performs a process of being registered with the control center 300 and transmits capability information. The capability information may include information about a channel used by the radio system A, particularly, an operating frequency, a bandwidth, and a power level.

Then, the control center 300 may transmit information on a list of available channels to the access point 220 of the radio system B based on the capability information. A list of the available channels includes information about idle frequencies.

Meanwhile, the access point 220 of the radio system B receives a list of the available channels and reselects a proper frequency band or channel from a list of the available channels according to a necessary frequency band. If there is no proper frequency band or channel, the access point 220 of the radio system B may inform the control center 300 of the fact. Alternatively, if there is no proper frequency band or channel, the access point 220 of the radio system B may request a list of available channels from the control center 300 again. In response thereto, the control center 300 may make a channel movement request from the access point 210 of the radio system A.

As described above, the access point 210 of the radio system A may first select one of idle channels, use the selected channel, and transmit information about the selected channel to the control center 300. Thus, the control center 300 may transmit a list of available channels to the access point 220 of the radio system B so that the access point 220 of the radio system B can select one channel from available channels, that is, channels not used by the access point 210 of the radio system A.

Meanwhile, referring to FIG. 2(b), the control center 300 may allocate channels to both the access point 210 of the radio system A and the access point 220 of the radio system B. That is, unlike in FIG. 2(a), the control center 300 by itself may check information on idle channels and allocate channels to the access point 210 of the radio system A and the access point 220 of the radio system B.

In FIG. 2, from among the radio system A and the radio system B, a communication system that uses a wider bandwidth or uses a bandwidth preferentially is called a primary communication system, and a communication system that uses a narrower bandwidth or uses a bandwidth with lower priority is called a secondary communication system.

Figure 3:
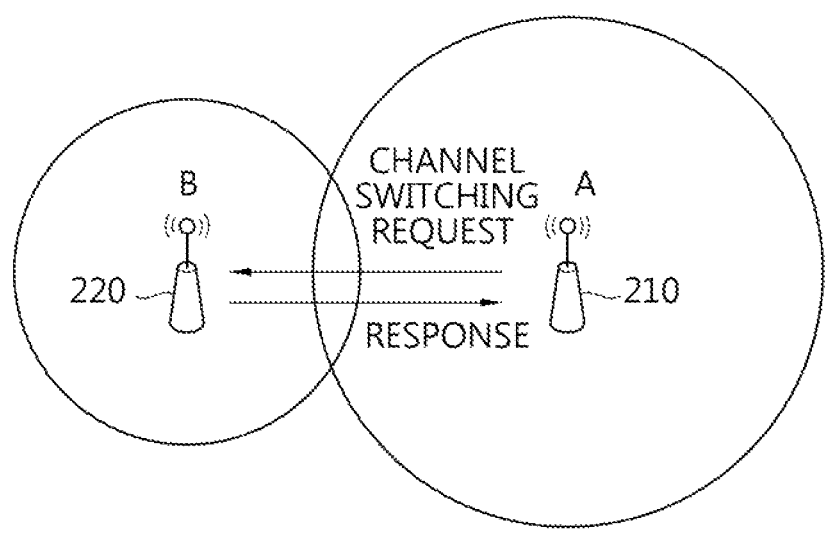
FIG. 3 is an exemplary diagram showing that a frequency is efficiently used between heterogeneous systems in an unlicensed frequency band in accordance with another embodiment of the present invention.

FIG. 3 is an exemplary diagram showing that a frequency is efficiently used between heterogeneous systems in an unlicensed frequency band in accordance with another embodiment of the present invention.

Particularly, FIG. 3 shows an example in which a frequency is managed in a distributed manner through a control channel so that the frequency can be efficiently used between heterogeneous systems in unlicensed frequency bands even without a central resource manager unlike FIG. 2.

As can be seen with reference to FIG. 3, the access point 210 of a radio system A and the access point 220 of a radio system B may mutually make a channel switch request. The channel switch request may be transmitted and received through a control channel between the access point 210 of the radio system A and the access point 220 of the radio system B.

That is, in the access point 210 of the radio system A and the access point 220 of the radio system B, any one access point can transmit the channel switch request to the other access point if there is interference between the two access points.

For example, in order avoid interference, the access point 210 of the radio system A may transmit a channel switch request message to the access point 220 of the radio system B. The channel switch request message may be transmitted unicast or may be transmitted broadcast. If the access point 220 of the radio system B determines to switch a channel (i.e., determine to move a center frequency), the access point 220 of the radio system B may transmit a response message to the access point 210 of the radio system A. The response message may be transmitted unicast or broadcast.

Figure 4:
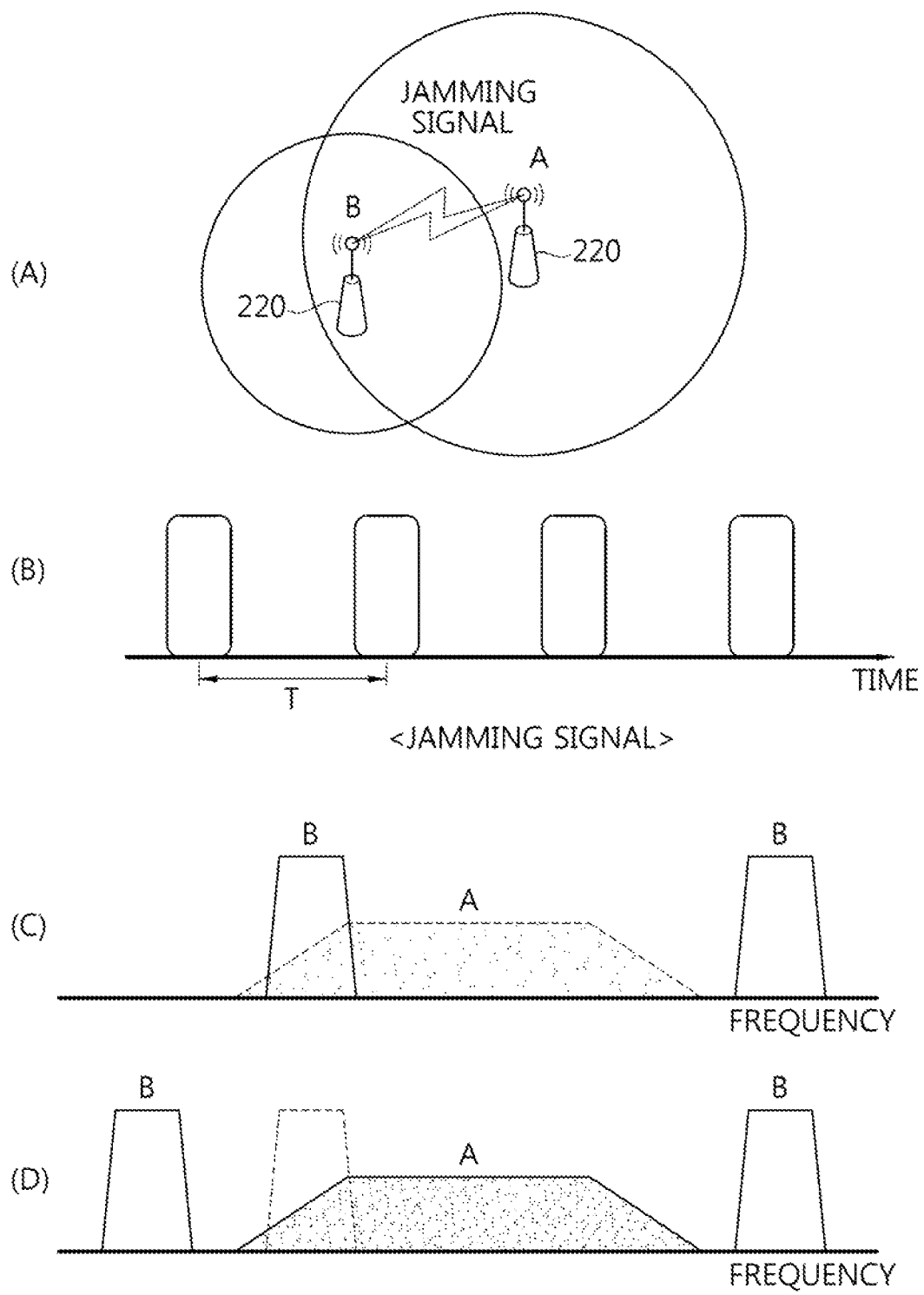
FIG. 4 is an exemplary diagram showing an example in which a frequency is efficiently used between heterogeneous systems in unlicensed frequency bands in accordance with yet another embodiment of the present invention.

FIG. 4 is an exemplary diagram showing an example in which a frequency is efficiently used between heterogeneous systems in unlicensed frequency bands in accordance with yet another embodiment of the present invention.

Unlike FIG. 3, FIG. 4 shows an example in which a frequency is used in a distributed manner between heterogeneous systems without a control channel.

As shown in FIG. 4(c), it is assumed that the access point 210 of a radio system A and the access point 220 of a radio system B have selects respective idle channels, that is, desired channels on idle frequencies or respective operating frequencies. Here, a communication system that uses a wider bandwidth is called a primary communication system, and a communication system that uses a narrower bandwidth is called a secondary communication system. In the examples of FIG. 4(c), the radio system A may be called a primary communication system because it uses a wider bandwidth, and the radio system B may be called a secondary communication system.

Furthermore, the access point of each of the radio systems can detect a signal from the access point of another system. Furthermore, the access point of each radio system can check whether it has authority to force the access point of another system to move an operating frequency.

Meanwhile, if channels or operating frequencies selected by the access point 210 of the radio system A and the access point 220 of the radio system B, respectively, interfere with each other, the access point of the radio system can search for an idle frequency band near its own operating frequency. That is, each of the radio systems can search for an idle frequency band into which its own operating frequency can migrate.

If each radio system cannot move its own operating frequency or does not want to move its own operating frequency, the radio system may transmit a jamming signal. The jamming signal may be transmitted with a period T as shown in FIG. 4(b).

When the jamming signal is transmitted as described above, the access point of the communication system B that uses a narrower bandwidth can move its center frequency as shown in FIG. 4(D). Meanwhile, after the communication system B moves the center frequency once in response to the jamming signal, the communication system B may have one-step higher priority in compensation for the movement. In other words, after the communication system B moves the center frequency once in response to the jamming signal, the communication system B may have another system move without moving the center frequency although it receives a subsequent jamming signal.

Figure 5:
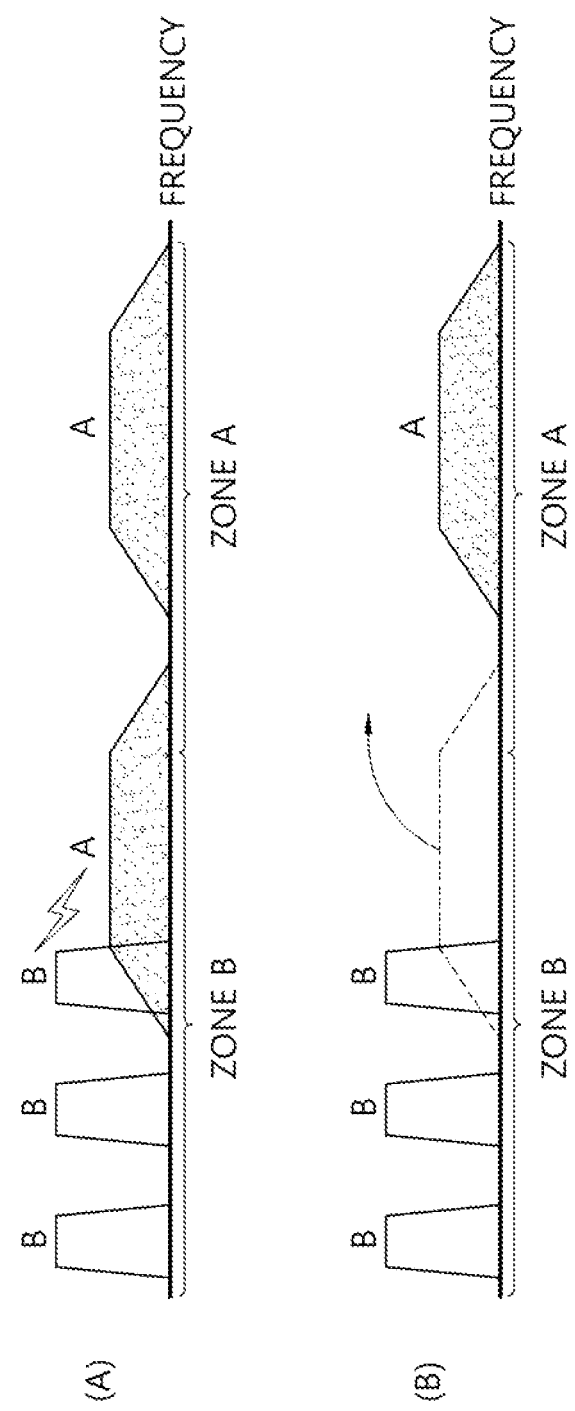
FIG. 5 is an exemplary diagram showing an example in which a frequency is efficiently used between heterogeneous systems in an unlicensed frequency band in accordance with further yet another embodiment of the present invention.

FIG. 5 is an exemplary diagram showing an example in which a frequency is efficiently used between heterogeneous systems in an unlicensed frequency band in accordance with further yet another embodiment of the present invention.

As can be seen with reference to FIG. 5, an unlicensed frequency band may be classified into zones and an owner for each zone may be determined. In other words, there are frequency sections allocated to respective heterogeneous systems and each of the systems uses a frequency section allocated thereto. Furthermore, only when a frequency is insufficient, each system may use the frequency section of a system having lower priority than itself.

Referring to FIG. 5(a), the owner of a zone A may be a communication system A, and the owner of a zone B may be a communication system B. It is assumed that the communication system A uses even the frequency band of the zone B because it requires a great bandwidth.

If the communication system A interferes with the communication system B because it uses the frequency band of the zone B as described above, the access point of the communication system A or the access point of the communication system B may transmit a jamming signal. Accordingly, the communication system A may move an operating frequency that has invaded the zone B to another place.

FIG. 6 is an exemplary diagram according to the architecture of an IEEE 802.19 standard in accordance with yet another embodiment of the present invention.

Referring to FIG. 6, there are shown one or more Coexistence Mangers (CMs) 510, 520, and 530 and a Coexistence Discovery and Information Server (CDIS) 600. The CDIS 600 may also be called a Coexistence Database (CDB). Alternatively, the CDIS 600 may be a super master CM.

As shown in FIGS. 6(a) and 6(b), radio communication systems A, B, and C have the respective CMs 510, 520, and 530. The radio communication systems A, B, and C are heterogeneous systems having different coverages, and a channel available for each of the systems may be flexible depending on a geographical location.

The CMs 510, 520, and 530 may exit within an access point. Alternatively, the CMs 510, 520, and 530 may be devices separate from the access points. FIG. 6(a) shows that the radio system B includes two cell coverages, but shows that only one CM 520 exists. Likewise, FIG. 6(A) shows that the radio system C includes three cell coverages, but shows that only one CM 530 exists. In this case, each of the CMs 520 and 530 is a device separate from an access point.

Meanwhile, as can be seen with reference to FIG. 6(a), the CDIS 600 may allocate specific channels, for example, a channel 1, a channel 2, and a channel 3, from among idle channels, to the respective CMs 510, 520, and 530.

As can be seen with reference to FIG. 6(b), the CDIS 600 may allocate the channel 1 to the CM 510 and the channels 2 and 3 to the CM 530.

Figure 7:
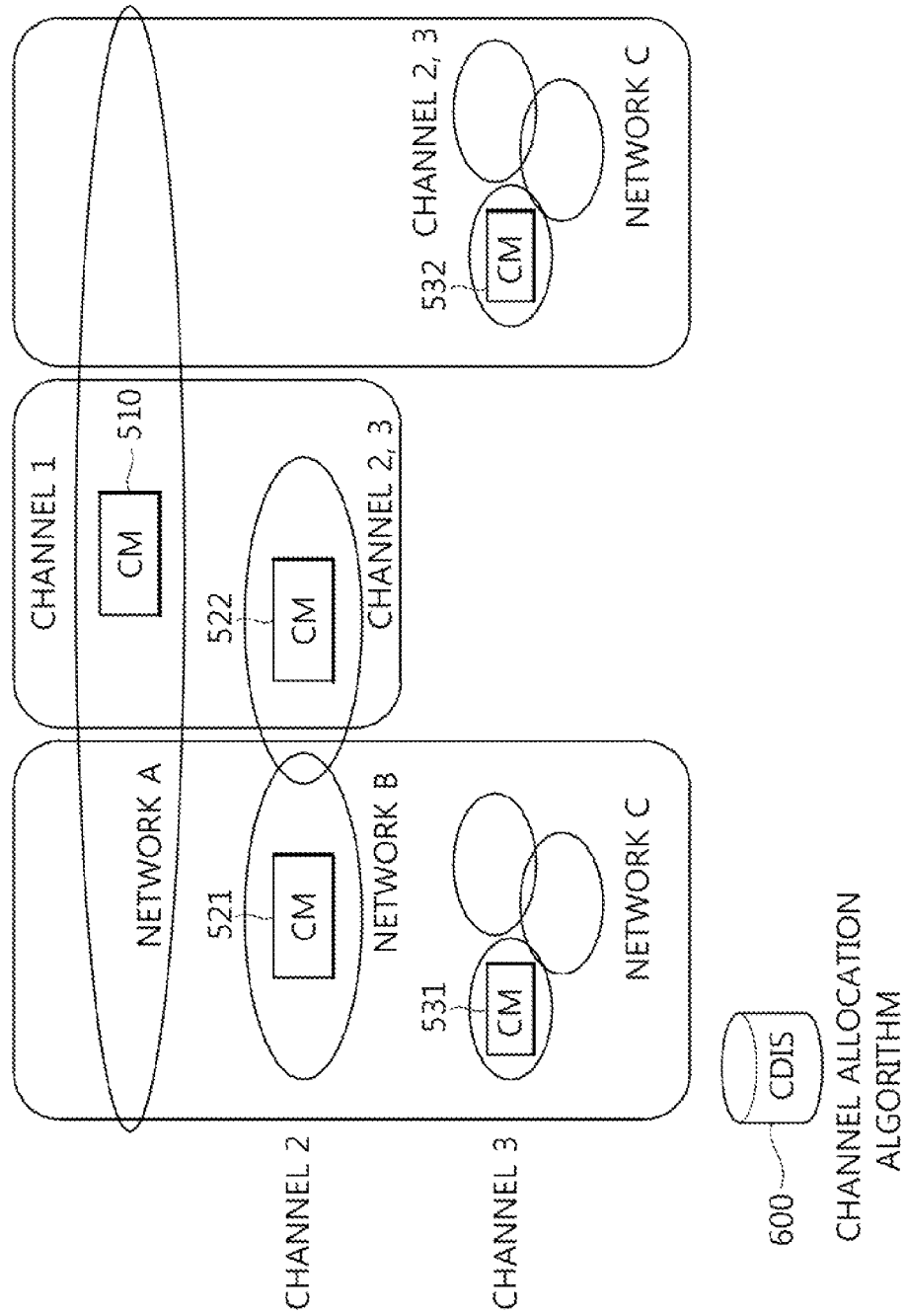
FIG. 7 is another exemplary diagram according to the architecture of an IEEE 802.19 standard in accordance with yet another embodiment of the present invention.

FIG. 7 is another exemplary diagram according to the architecture of an IEEE 802.19 standard in accordance with yet another embodiment of the present invention.

FIG. 7 is shown according to frequencies and space. As can be seen with reference to FIG. 7, when the number of neighborhoods is increased, CMs are necessary in order to make efficient spatial reuse. For example, a CM 510 does not include any communication network in a horizontal direction, but includes a network B downwardly in a vertical direction, thus becoming a CM. Meanwhile, a CM 521 includes another access point in a horizontal direction and also includes a network A and a network C in a vertical direction, so that the CM 521 is selected as a CM.

A CDIS 600 allocates idle channels to the CMs selected as described above. Here, the CDIS 600 allocates the idle channels so that the channels can be spatially reused. For example, a channel 2 is allocated to a CM 521 and a CM 522. Furthermore, the channel 2 is allocated to a CM 532. Likewise, a channel 3 is allocated to the CM 522, a CM 531, and the CM 532. In order for the channels to be spatially reused as described above, there is a need for information about an interference influence between CMs, for example, information of a map form. The information may be formed using, for example, information about a geographical location or information about adjacent devices obtained from CMs.

FIG. 8 is another exemplary diagram according to the architecture of an IEEE 802.19 standard in accordance with yet another embodiment of the present invention.

As can be seen with reference to FIG. 8, each of CMs may select one or more of idle channels in order of its coverage size. In other words, each CM may select one of idle channels hierarchically in order of its coverage size.

In the case of FIG. 8(a), there are a network A, a network B, and a network C in descending powers of a coverage size. The network B may include two access points owing to smaller coverages, and the network C may include three access points owing to further smaller coverages. Here, the CM 510 of the network A having the largest network coverage first selects channels to be used by itself from idle channels because it has the largest coverage. Here, the CM 510 may take the fact that other CMs select channels into consideration when selecting the channels to be used itself. Furthermore, the CM 510 may obtain information about the idle channels from a CDIS. Alternatively, the CM 510 may obtain information about the idle channels from another CM. The channels selected as described above may be two channels on the left side as shown. Next, the CM 520 of the network B having the second-largest coverage selects channels to be used itself from the remaining idle channels other than the channels occupied by the network A. Furthermore, likewise, the CM 530 of the network C selects channels to be used itself from the remaining idle channels other than the channels that are occupied by the network A and the network B.

As described above, in FIG. 8(a), CMs may select channels to be used themselves in descending powers of a coverage size.

Meanwhile, unlike in FIG. 8(a), in FIG. 8(b), a CM 530 having the smallest coverage in ascending powers of a coverage size may first select channels to be used itself from idle channels. The reason why a CM having a small coverage first selects channels as described above is that if coverage is small, the number of idle channels that may be used by other CMs is increased. Accordingly, if a system having a small coverage obtains a list of channels available for other systems, there is an advantage in that channels that may be used by the system having a small coverage, but may not be used by systems having greater coverages can be preferentially secured.

Figure 9:
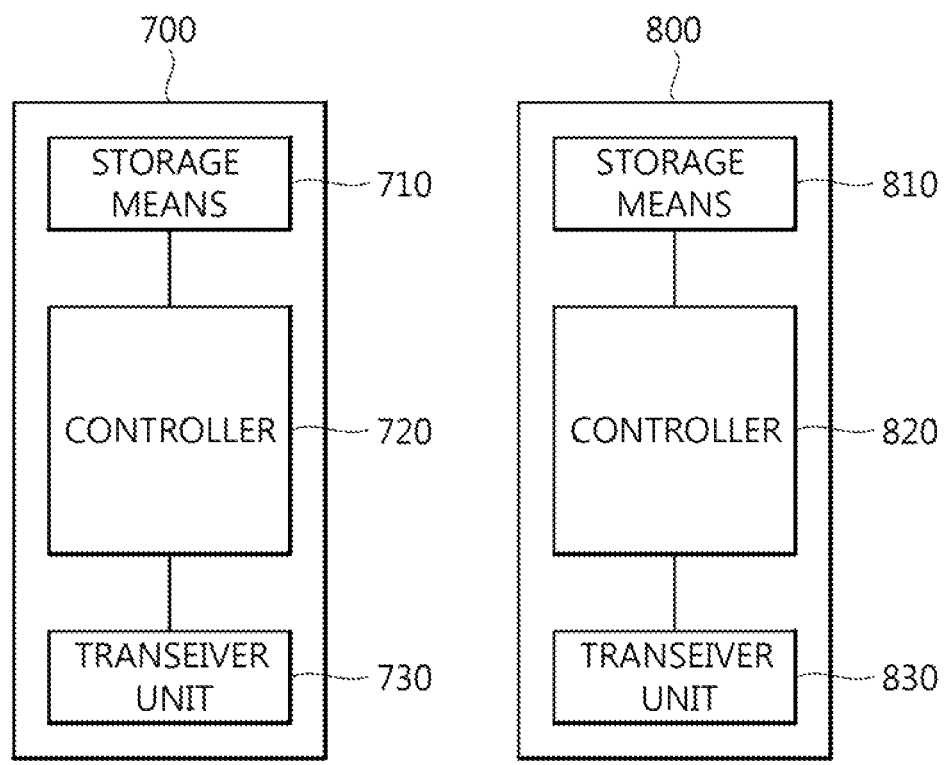
FIG. 9 is a block diagram of a control center 700 and a CM 800 according to the present invention.

FIG. 9 is a block diagram of a control center 700 and a CM 800 according to the present invention.

As shown in FIG. 9, the control center 700 includes storage means 710, a controller 720, and a transceiver unit 730. Furthermore, the CM 800 includes storage means 810, a controller 820, and a transceiver unit 830.

The storage means 710 and 810 store the methods in accordance with the methods shown in FIGS. 2 to 8.

The controllers 710 and 810 control the storage means 710 and 810 and the transceiver units 730 and 830. Particularly, the controllers 720 and 820 execute the methods stored in the storage means 710 and 810, respectively. Furthermore, the controllers 720 and 820 transmit the above-described signals through the transceiver units 730 and 830.

Although the preferred embodiments of the present invention have been illustrated, the scope of the present invention is not limited to the specific embodiments and the present invention may be modified, changed, or improved in various ways within the scope of the present invention and the category of the claims.

The invention claimed is:

1. A method of efficiently using channels by an access point, the method comprising the steps of:
   selecting a specific channel from channels configured to be shared along with a heterogeneous communication scheme; and
   performing an interference avoidance procedure if the selected channel interferes with a neighboring access point,
   wherein the avoidance procedure comprises a process of making a request to switch a channel of the neighboring access point, a process of notifying to the neighboring access point, and a process of changing the selected channel into another channel,
   wherein the neighboring access point uses a heterogeneous communication scheme,
   wherein the process of making the request to switch the channel comprises requesting an entity that is responsible for a control function to switch the channel of the neighboring access point,
   wherein the process of notifying comprises transmitting a signal indicating that the selected channel interferes with the neighboring access point,
   wherein the signal is transmitted through a dedicated control channel for the neighboring access point,
   wherein the process of making the request to switch the channel comprises, when the access point has a specific bandwidth larger than the neighboring access point, requesting the neighboring access point through the dedicated control channel to switch the channel of the neighboring access point,
   wherein the process of changing the selected channel into another channel comprises, when the access point has a specific bandwidth smaller than the neighboring access point, receiving from the neighboring access point through the dedicated control channel a request to switch the selected channel into the another channel,
   wherein the access point and the neighboring access point are coexistence managers (CMs) and the selected channel is a TV white space channel obtained from a coexistence database (CDB), and
   wherein a CM having the specific bandwidth has a higher priority to select the TV white space channel than a CM having the narrower bandwidth.

2. An access point, comprising:
   a transceiver; and
   a processor configured to
      select a specific channel from channels configured to be shared along with a heterogeneous communication scheme,
      determine whether the selected channel interferes with a neighboring access point, and
      perform an avoidance procedure if the selected channel interferes with the neighboring access point,
      wherein the avoidance procedure comprises a process of making a request to switch a channel of the neighboring access point, a process of notifying to the neighboring access point, and a process of changing the selected channel into another channel,
      wherein the neighboring access point uses a heterogeneous communication scheme,
      wherein the process of making the request to switch the channel comprises requesting an entity that is responsible for a control function to switch the channel of the neighboring access point,
      wherein the process of notifying comprises transmitting a signal indicating that the selected channel interferes with the neighboring access point,
      wherein the signal is transmitted through a dedicated control channel for the neighboring access point,
      wherein the process of making the request to switch the channel comprises, when the access point has a specific bandwidth larger than the neighboring access point, requesting the neighboring access point through the dedicated control channel to switch the channel of the neighboring access point,
      wherein the process of changing the selected channel into another channel comprises, when the access point has a specific bandwidth smaller than the neighboring access point, receiving from the neighboring access point through the dedicated control channel a request to switch the selected channel into the another channel, wherein the access point and the neighboring access point are coexistence managers (CMs) and the selected channel is a TV white space channel obtained from a coexistence database (CDB), and wherein a CM having the specific bandwidth has a higher priority to select the TV white space channel than a CM having the narrower bandwidth.

\* \* \* \* \*